(12) United States Patent
Barrett

(10) Patent No.: US 6,237,800 B1
(45) Date of Patent: May 29, 2001

(54) DUAL PURPOSE WATER BOTTLE

(76) Inventor: Anne Scott Barrett, P.O. Box 183, Stinson Beach, CA (US) 94970

( * ) Notice: Subject to any disclaimer, the term of this patent is extended or adjusted under 35 U.S.C. 154(b) by 0 days.

(21) Appl. No.: 09/606,443

(22) Filed: Jun. 30, 2000

(51) Int. Cl.⁷ .................................................. B65D 23/00
(52) U.S. Cl. ...................... 220/505; 220/703; 220/915.1; 215/6; 215/312
(58) Field of Search ..................................... 220/505, 703, 220/711, 715, 915.1; 215/6, 312

(56) References Cited

U.S. PATENT DOCUMENTS

| | | | | |
|---|---|---|---|---|
| 1,977,414 | * | 10/1934 | Testa | 215/312 X |
| 2,641,788 | * | 6/1953 | Sudbeaz | 215/312 X |
| 2,913,746 | * | 11/1959 | Schaich | 215/312 X |
| 3,327,881 | * | 6/1967 | Maier | 215/6 |
| 4,603,784 | * | 8/1986 | Chang | 220/916 X |
| 5,630,523 | * | 5/1997 | Wright | 215/6 X |
| 5,632,407 | * | 5/1997 | Christensen | 220/703 X |
| 6,105,812 | * | 8/2000 | Riordan | 215/6 X |

\* cited by examiner

*Primary Examiner*—Steven Pollard

(57) ABSTRACT

Dual purpose water bottle with a water bottle having a cylindrical shape and having a perpendicularly disposed dividing wall roughly half way down the cylindrical shape and having a threaded opening on each end of the cylindrical shape, one the end receiving a closure that includes a openable and re sealable drinking spout, the opposite the end having a roller ball drinking mechanism ideal for dogs and other pets, and the roller ball drinking mechanism having an outer sleeve that when turned clockwise causes a water tight seal between said roller ball and said outer sleeve, and when turned counter clockwise allows the roller ball to spin freely and to release water in a controlled fashion.

1 Claim, 4 Drawing Sheets

DUAL PURPOSE WATER BOTTLE

BACKGROUND OF THE INVENTION

This invention relates generally to the field of portable water bottles, and more particularly to dual purpose water bottle.

Drinking bottles are known. Many styles and sizes of water bottles are available in todays market. Water bottles are carried by individuals so that when traveling or in a location where there is no access to clean drinking water a person and quench his or her thirst in a convenient manner. Many of todays water bottles have drinking spouts that allow the user to easily open the spout, have a drink, and then close the spout again. Many of these spouts work by pulling on the drinking spout to take a drink and then pushing down on the spout to close the bottle in water tight fashion. Many people travel with pets, such as a dog or cat. Pets also have the need to drink water from time to time and pet owners find it necessary to carry a second water container for their pets. Alternately, a pet owner could carry one water bottle and a water dish to pour water from the bottle to the dish. In either case the user must carry two items, either two water bottles or a water bottle and a dish. Since pets drink water by licking action they must either have a dish to drink from or another means to lick water from.

SUMMARY OF THE INVENTION

The primary object of the invention is to provide a dual purpose water bottle that allows both people and pets to drink water independently and in a sanitary fashion from the same bottle.

Other objects and advantages of the present invention will become apparent from the following descriptions, taken in connection with the accompanying drawings, wherein, by way of illustration and example, an embodiment of the present invention is disclosed.

Dual purpose water bottle comprising: a water bottle having a cylindrical shape and having a perpendicularly disposed dividing wall roughly half way down the cylindrical shape and having a threaded opening on each end of said cylindrical shape, one said end receiving a closure that includes a openable and re sealable drinking spout, the opposite said end having a roller ball drinking mechanism ideal for dogs and other pets, and said roller ball drinking mechanism having an outer sleeve that when turned clockwise causes a water tight seal between said roller ball and said outer sleeve, and when turned counter clockwise allows the roller ball to spin freely and to release water in a controlled fashion.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
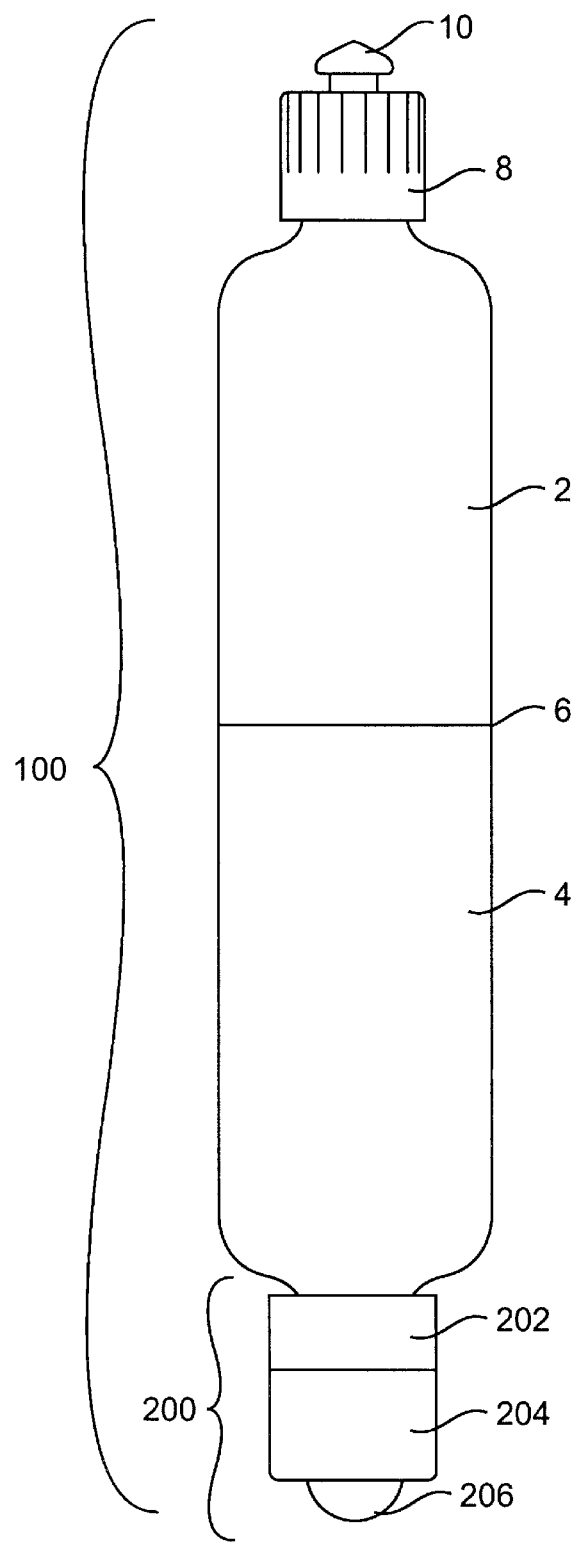
FIG. 1 is a front view of the dual purpose water bottle of the present invention
Figure 2:
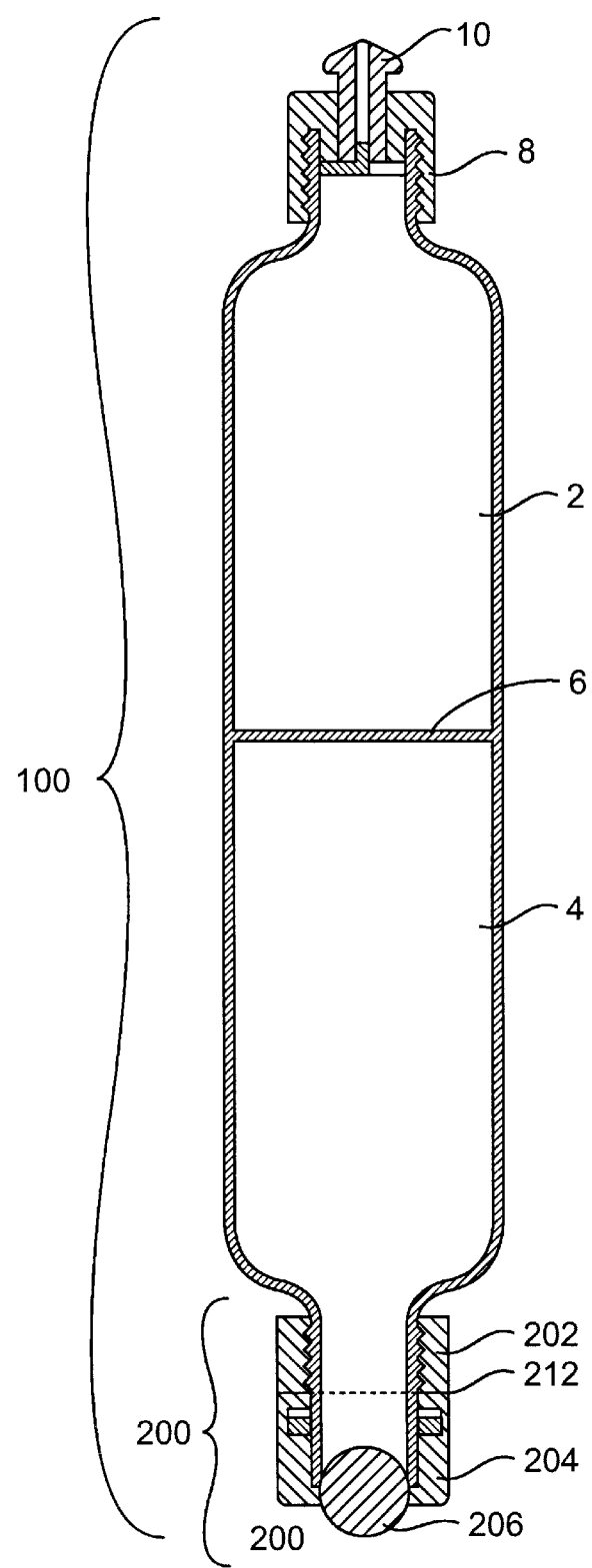
FIG. 2 is a front section view of the water bottle of the present invention.
Figure 3:
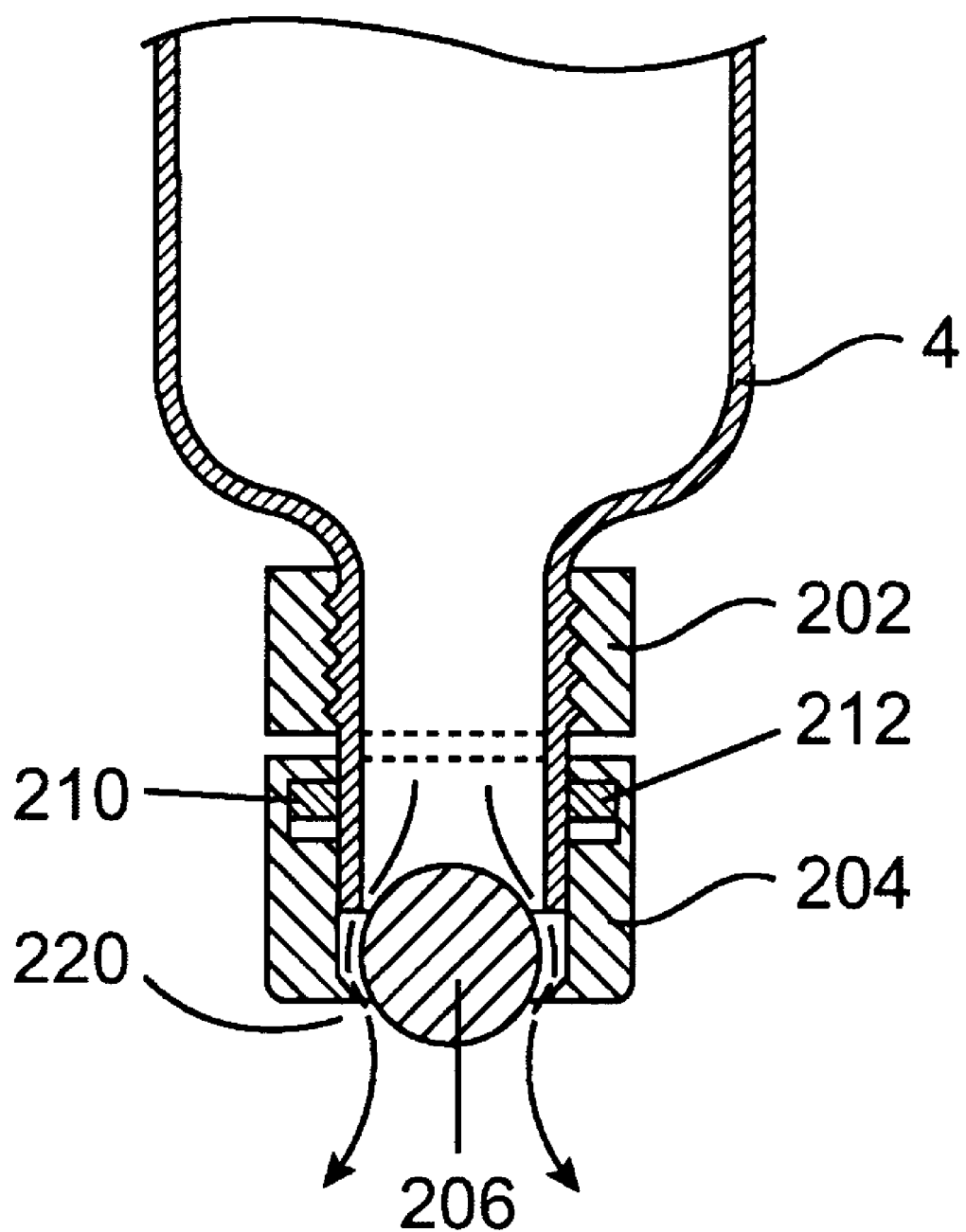
FIG. 3 is a detailed section view of the roller ball portion of the present invention
Figure 4:
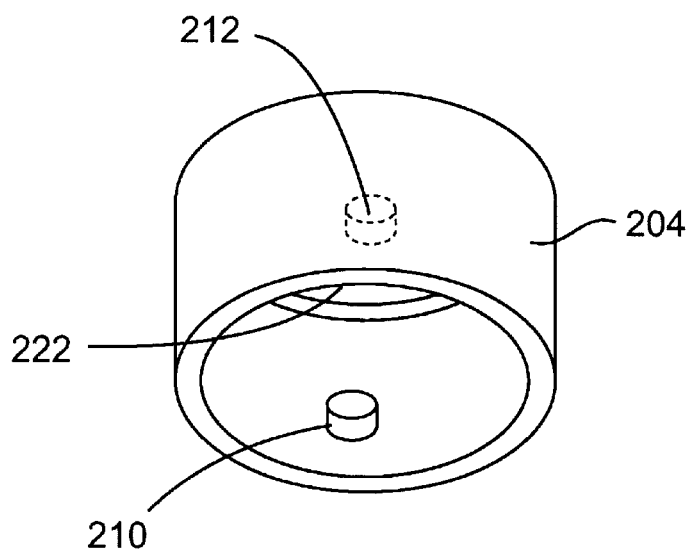
FIG. 4 is an exploded view of the roller ball mechanism of the present invention.

Referring now to FIG. 1 we see a front view of the water bottle of the present invention 100. The bottle 2,4 is roughly cylindrical in shape and has a separating wall 6 that is perpendicularly disposed with relationship to the cylinder wall and approximately half the distance down the cylinder 2,4 effectively creating two water carrying compartments, 4. Water carrying compartment 2, is terminated by a threaded cap 8 having a built in drinking spout 10 that is commonly found in existing water bottles. Water carrying compartment 4 is terminated by a custom cap 200 that retains a roller ball 206. This type of roller ball 206 is ideal for a dog or other pet to lick and thereby have access to the water within compartment 4. FIG. 2 shows a section view of the invention 100. Drinking cap 8 is threaded in place on male threads 32 that are molded into the plastic water retaining vessel 2. When spout 10 is pulled out, water can flow through the spout and into the users mouth or into a glass or the like. When spout 10 is pushed back in it causes a seal so that water can not leak out of cap 8. Cap assembly 200 is designed for allowing a pet to obtain water by licking. Ball retaining collar 204 can be twisted by the user causing retaining collar to loosen as shown in FIG. 3 thereby letting water 220 to flow out and around ball 206. When the pet licks ball 206 it receives water 220. Pins 210, 212 interact with slots located in collar 204 thereby guiding collar 204 away from threaded collar 202. This design can be seen more clearly in FIG. 4 where posts 210, 212 protrude from the inner wall of collar 204. These posts 210, 212 interact with slots 208, 209 (not shown, mirror image of 208). Slots 208, 209 are angled so that when the user turns the collar 204 clockwise, the collar tightens down onto threaded collar 202 and causes roller ball 20 to be pushed against inside lip 222 of retaining collar 204. When the user turns the collar 204 counter clockwise, posts 210, 212 are guided upwards, away from threaded collar 202, thereby causing a path for water to travel and surround roller ball 206. Threaded collar 202 interfaces with male threads 30 so that the user can easily refill water compartment 4.

Obviously, certain additions can be made such as an insulated sleeve surrounding the bottle or a standard carrying strap and or sanitary caps that cover the roller ball mechanism 200 and or the drinking spout 10.

In the above described and illustrated way a person can carry one water bottle that can accommodate both a humans drinking needs and well as a pets drinking needs. The two drinking portions are separated so that sanitary drinking conditions are assured.

While the invention has been described in connection with a preferred embodiment, it is not intended to limit the scope of the invention to the particular form set forth, but on the contrary, it is intended to cover such alternatives, modifications and equivalents as may be included within the spirit and scope of the invention and defined by the appended claims.

What is claimed is:

1. Dual purpose water bottle comprising:
    a water bottle having a cylindrical shape and having a perpendicularly disposed dividing wall roughly half way down the cylindrical shape and having a threaded opening on each end of said cylindrical shape;
    one said end receiving a closure that includes a openable and re sealable drinking spout;
    the opposite said end having a roller ball drinking mechanism ideal for dogs and other pets; and
    said roller ball drinking mechanism having an outer sleeve that when turned clockwise causes a water tight seal between said roller ball and said outer sleeve, and when turned counter clockwise allows the roller ball to spin freely and to release water in a controlled fashion.

* * * * *